Dec. 4, 1923.

V. PACE

COOKING APPARATUS

Filed June 16, 1920  3 Sheets-Sheet 1

Inventor
Vincenzo Pace
By his Attorneys

Dec. 4, 1923.

V. PACE 1,476,215

COOKING APPARATUS

Filed June 16, 1920

Inventor
Vincenzo Pace
By his Attorneys

Dec. 4, 1923.
V. PACE
COOKING APPARATUS
Filed June 16, 1920
1,476,215
3 Sheets-Sheet 3
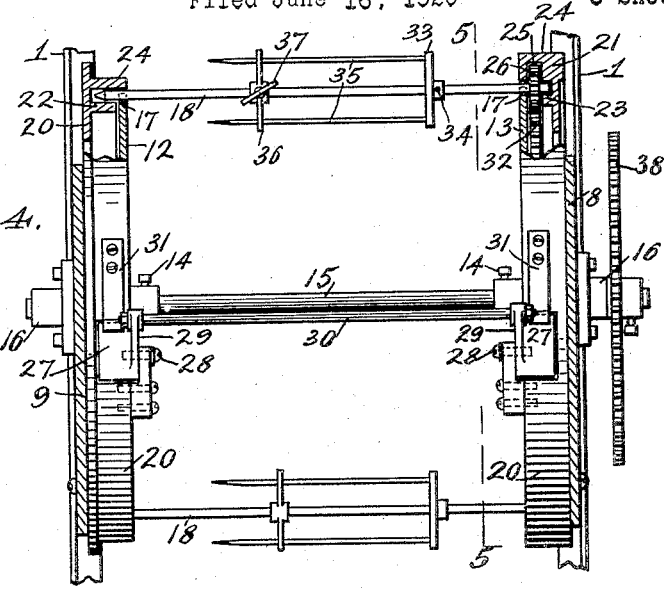
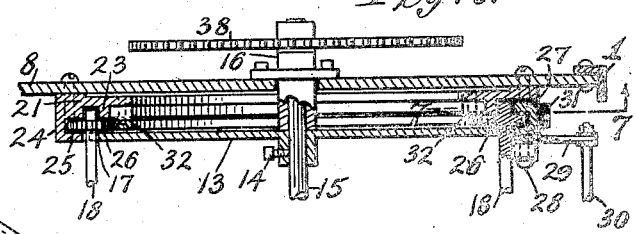
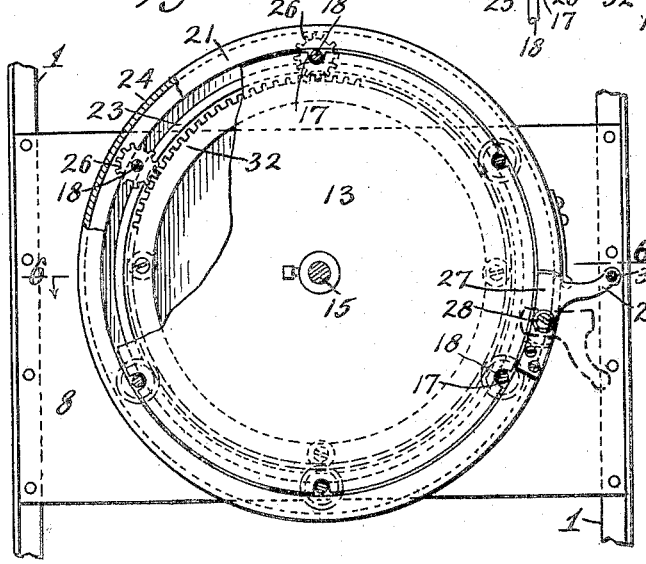
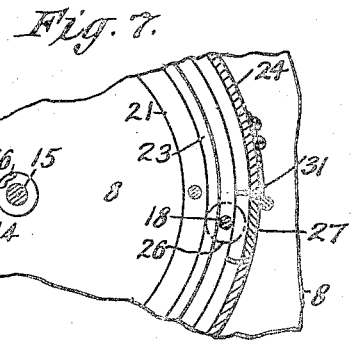
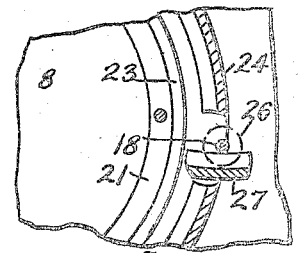
Inventor
Vincenzo Pace
By his Attorneys Patented Dec. 4, 1923.

1,476,215

UNITED STATES PATENT OFFICE.

VINCENZO PACE, OF NEW YORK, N. Y.

COOKING APPARATUS.

Application filed June 16, 1920. Serial No. 389,356.

*To all whom it may concern:*

Be it known that I, VINCENZO PACE, a citizen of the United States, residing at New York, county of New York, and State of New York, have invented certain new and useful Improvements in Cooking Apparatus, fully described and represented in the following specification and the accompanying drawings, forming a part of the same.

This invention relates to certain improvements in apparatus for cooking meat, etc., as by roasting, and has been designed particularly for cooking a large number of pieces, such as is necessarily done in hotels, restaurants, and the like, where food is prepared in quantities.

Generally the invention consists in the provision of supporting a frame in which is mounted a carrier capacitated to carry a number of holders or spits on which the meat or other food is secured. This carrier is given a rotary movement past a source of heat which is preferably located at one side of the carrier, and the spits are also given a movement about their own axes so that the food is brought evenly under the influence of the heat. This carrier is also supported so that the food, where desired, may be automatically basted, a basting holder being provided adjacent the carrier, and the carrier and this holder being mounted to have a relative movement with respect to each other so that the food as it is brought around by the carrier may be dipped into the basting fluid as much as desired, or if no basting is required, the food may be run free of the basting fluid.

It is the especial object of the invention to provide a simple and compact apparatus for effecting the features above briefly referred to, and in which the basting of the food may be automatically effected.

It is a further object of the invention to improve the detail features of the apparatus, and particularly the devices employed for mounting and driving the spits, so that the spits may be readily inserted and removed from the apparatus.

With these and other objects not specifically referred to, the invention consists in certain novel parts and combinations which will be fully described in connection with the accompanying drawings and then pointed out in the claims.

In the drawings—

Figure 4 is a detail sectional face view partly broken away showing the preferred means for mounting the spits.

Figure 5 is an end view, partly in section, taken on line 5—5 of Fig. 4.

Figure 6 is a detail sectional view taken on line 6—6 of Fig. 5.

Figure 7 is a detail sectional view taken on line 7—7 of Fig. 6, showing in detail the removable section through which a spit may be removed, the parts being shown in closed position; and Figure 8 is a similar view showing the parts open.

Referring now to these drawings, the apparatus will include a frame of any suitable or desired construction. As shown this frame comprises upright supporting bars 1 and top and bottom supporting bars 2, 3, the bars 1 rising from any suitable support as the floor, not shown.

Figure 3:
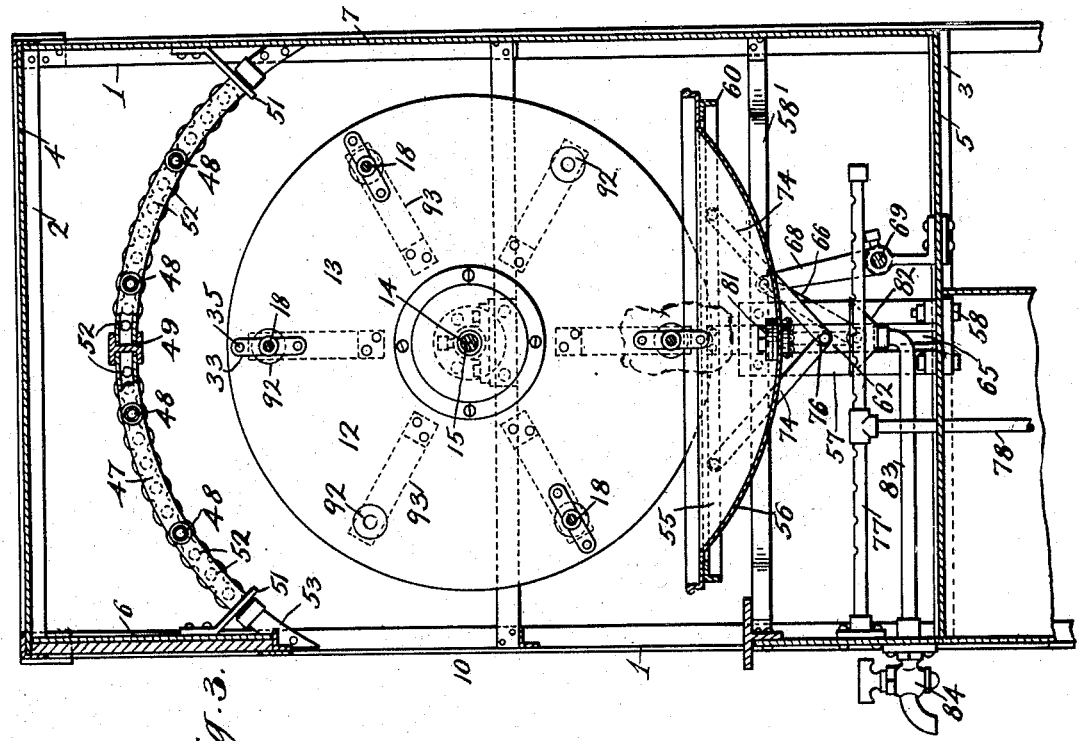
Figure 3 is a sectional side view taken on line 3—3 of Fig. 2.

The apparatus is closed by a top 4 supported from the top supporting bars 2 and there is provided a bottom plate 5 supported from the lower supporting bars 3, this plate acting as a base for the operating mechanism hereinafter referred to. The framing also supports front and back walls 6, 7, in the form of plates, and side walls 8, and 9. The front wall is provided with an opening, indicated at 10 in Fig. 3, and the side wall 8 is also provided with openings, indicated at 11 in Fig. 2, through which access may be had to the operating parts of the apparatus.

Mounted in the frame is a spit carrier capacitated to carry a plurality of spits, and this spit carrier is supported so as to receive a rotary movement. The specific construction of this carrier may be widely varied. As illustrated, however, the carrier includes a pair of heads or spiders 12 and 13, which are secured as by set screws 14 to a shaft 15 mounted in suitable bearings 16, supported in any suitable manner from the side walls 8, 9, before referred to.

In the preferred construction the spits are carried by this spit carrier and also given a rotary movement about their own axes. While this may be effected in various ways, preferably for convenience in inserting and removing a spit from the carrier, a construction such an illustrated in Figs. 4 to 7 is employed, and will be first described. As shown the carrier heads are formed with a plurality of grooves or recesses 17 as shown in Fig. 5, into which may be dropped the ends of the spindles 18 of the spits.

Co-operating with the carrier heads are a pair of castings 20, 21, in which are formed tracks 22, 23, these tracks being closed by rims 24, the spindles 18 being carried around by the carrier and held in position by the tracks.

One of the rims 24 is provided with a circumferential recess or groove 25 in which may freely run gears 26 fast on one end of the spindles 18, before referred to, a gear being provided for each spindle. The rims 24 are at the front of the machine formed with a movable section 27 clearly shown in Figs. 7 and 8, the sections when closed forming continuation of the rims and preventing the spindles from falling out of position, but when opened acting as doors through which the spindles with their driving gear may be quickly and readily removed and inserted.

The removable sections 27 are pivotally secured to the rims as by pivots 28, and the sections are formed with arms 29 connected to a rod 30, which provides an operating handle for swinging the sections to open or closed position, the section 27 being held closed by spring catches 31. With this construction the spit spindles 18 are held and guided in position as they rotate with the carrier and at the same time may be quickly and easily removed from the machine.

Various means be provided for rotating the spindles on their axes as they rotate with the carrier. In the particular construction illustrated, and to make the spindles readily removable, each spindle is provided at one end with one of the small gears 26 fast thereto. These gears mesh with a stationary gear 32 rigidly secured to one of the side walls, as wall 8, before referred to, the gears 26 walking around this gear 32 and being rotated by their movement with the carrier.

Any suitable form of spit may be employed. In the particular construction illustrated, there is provided a spit head 33, secured to the spindle 18 as by collar and screw 34. This head has extended therefrom a pair of pointed spit bars 35 on which work a holder 36, slidably mounted on the spindle 18, a clamping screw 37 being provided for clamping the holder in position on the spindle. With this construction after the meat or other food has been impaled on the spits, the holder 36 may be moved toward the head 33 to clamp the food rigidly in position on the spit bars.

Figure 2:
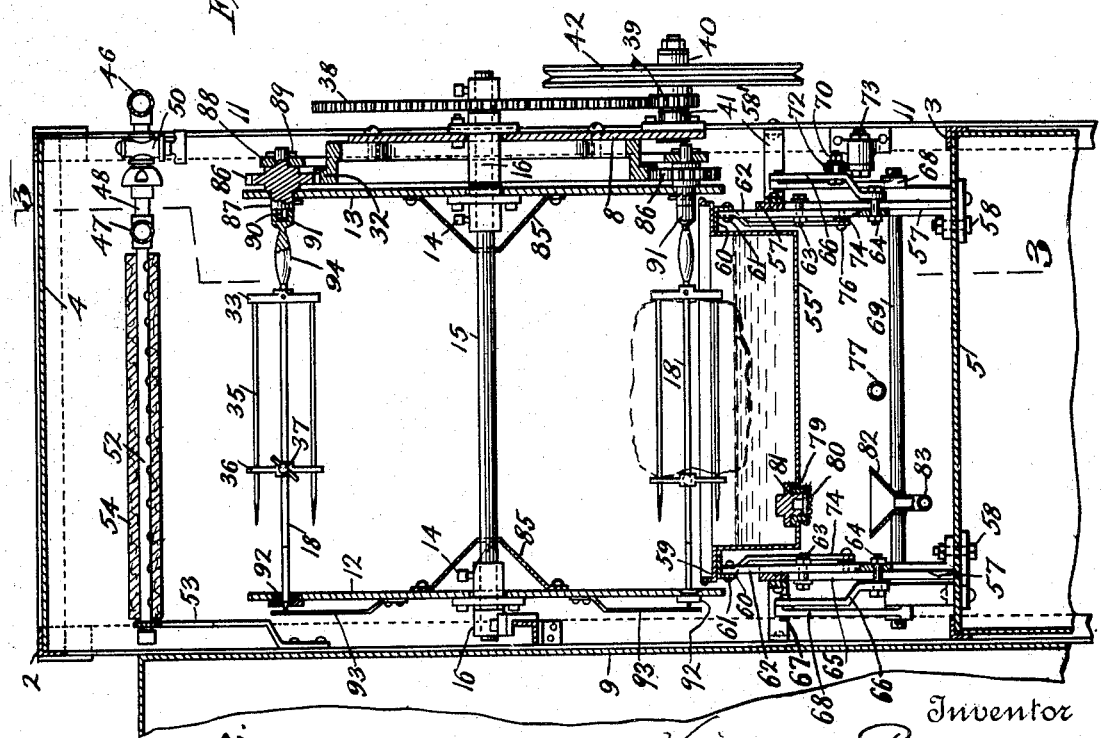
Figure 2 is a sectional front view of the construction shown in Fig. 1, the section being taken on line 2—2 of that figure.

The spit carrier may be driven in any suitable manner. As illustrated in Figs. 2 and 4, the shaft 15, before referred to, is extended beyond the supporting wall 8 and has secured thereto a driving gear 38, this gear 38 meshing with a gear 39, mounted on a hub 40 supporting bearings 41 secured in the side wall 8. This hub carries a pulley 42 to which power may be transmitted from any suitable source, not illustrated. While a pulley drive has been shown, it will be understood that a motor or any other suitable prime mover may be employed.

The carrier is moved with the spits past any suitable source of heat. In the best constructions and as shown, in order to get an even cooking and to permit of the basting of the food being cooked, the carrier is, as shown, mounted and operated with respect to the heat source, so that the food is gradually brought up to the influence of the heat and then removed therefrom during the rotation of the carrier. To effect this the carrier is, as shown, arranged with the heat source located at one side of the carrier, so that the food being cooked is not at all times under the maximum influence of the cooking heat. In the preferred construction and as shown, the cooking heat is at a point above the carrier which is mounted on a longitudinal axis. The cooking heat is supplied (see Figs. 1 and 2) in the particular construction illustrated, by means of a series of gas pipes, though it will be understood that electric heating or any other suitable source of heat may be employed. Whatever the source of heat, however, in the best constructions, the heating will be arranged so that the amount of heat supplied may be varied depending on the character and amount of the food being cooked. As illustrated, there is provided a main gas supply pipe 44 connected with a suitable gas supply, not illustrated. This pipe delivers the gas to the cooking pipes proper which are arranged longitudinally of the apparatus so as to extend over the spit carrier. These pipes are arranged in sets, four sets being illustrated. Means may be provided whereby one of these sets may be cut out without affecting the others so that the amount of heat delivered may be varied as desired.

While various means for effecting this may be employed, in the particular construction illustrated, the main supply pipe 44 is connected (see Fig. 1) by an elbow 45 to a supply pipe 46 located outside the frame of the machine. This pipe is connected to a feed pipe 47 curved to conform to the curvature of the carrier by means of a plurality of short connecting pipes 48. The feed pipe 47 is divided by a partition 49, and the connecting pipes 48 between the pipes 46 and 47 are provided with valves 50. The feed pipes 47 are supported from hangers 51 suitably secured to the inner surface of the front and back walls, before referred to, and this pipe 47 supplies with gas small pipes 52, these pipes being supported from the pipe 47 at one end and at the other end in brackets 53 secured to the sidewall 9, before referred to. These pipes 52 are provided in sufficient numbers to give the heating effect required. In the preferred construction they are covered with asbestos, indicated by the numeral 54, which when heated becomes red hot and gives a wide heating surface and one regularly controlled. With this construction it will be seen that by manipulating the valves 50 more or less gas can be given to the two sections of the pipe 47 and the heat delivered at the front and rear of the apparatus regulated as desired.

Machines embodying the invention will be provided with mechanism for automatically basting the food being cooked, this mechanism being arranged adjacent the carrier so that as the carrier rotates the food carried by spits may be dipped in a basting fluid, the mechanism being of such character that there is a relative adjustment between the basting fluid holder and the carrier, so that the food may be basted more or less as required, or the basting may be omitted altogether if desired. While the particular construction for effecting this may be varied within wide limits, as illustrated there is provided a pan 55 having a bottom 56 of curved shape so as to permit the basting fluid to be readily drawn off from the pan when desired, this pan being located below the carrier and extending substantially the length thereof and is wider than the length of the spits so that the juices will drop into the pan as the cooking operation proceeds.

This pan and the carrier may be mounted so as to have a relative adjustment, in any suitable manner, but in the machine illustrated the pan is mounted so that it can be moved toward and away from the carrier. In the particular construction illustrated (see Figs. 1 to 3) there is secured at each side of the apparatus a slotted frame or block 57, this block being secured by bolts 58 to the base plate 5, before referred to, and a cross bar 58'. The pan at each side is formed with a flange 59 which rests on angle bars 60 secured at 61 to two arms 62. These arms are provided with upper and lower studs 63 and 64 which work in slots 65 of the blocks 57, before referred to. The lower stud is connected to a link 66 which is pivoted at 67 to a link 68 pivoted on a shaft 69. The link 66 is provided with a pin 70 which works in a slot 71 in an operating lever 72 pivoted at 73 to one of the frames 1, before referred to. Supporting struts or links 74 secured at 75 to the pan and at 76 to the arms 62 are or may be provided for assisting in supporting the pan. By operating the lever it will be seen that through the action described the pan may be elevated or lowered relatively to the spits on the carrier so that the spits during their rotation may be dipped to the desired degree into the basting fluid contained in the pan and an automatic basting of the pieces on the spits effected.

If desired a pipe 77 may be suitably supported in the sides of the apparatus for supplying a gas flame to keep the basting fluid hot, this pipe 77 being supplied from a pipe 78 from a suitable source of gas supply, not shown.

Where a basting pan is employed, means will be provided whereby the basting fluid may be drawn off from the pan. As illustrated the bottom of the pan is provided with an aperture 79 having the bottom covered with a screen 80 and closed by a removable block 81. When it is desired to draw off the basting fluid the pan may be lowered and the basting fluid drawn off through the aperture 79 through a funnel 82 connected with a pipe 83 provided outside the machine with a draw-off cock 84. With this construction the basting may be regulated and controlled as desired and the basting fluid maintained at the regular temperature. If desired baffles or shields in the form of cone-shaped pieces of metal marked 85 in Fig. 1, may be secured to the carrier heads, the function of these baffles being to prevent the juices coming from the meat being cooked from getting into the bearings of the shaft 15 and directing the juices between the carrier heads to the basting pan.

Figure 1:
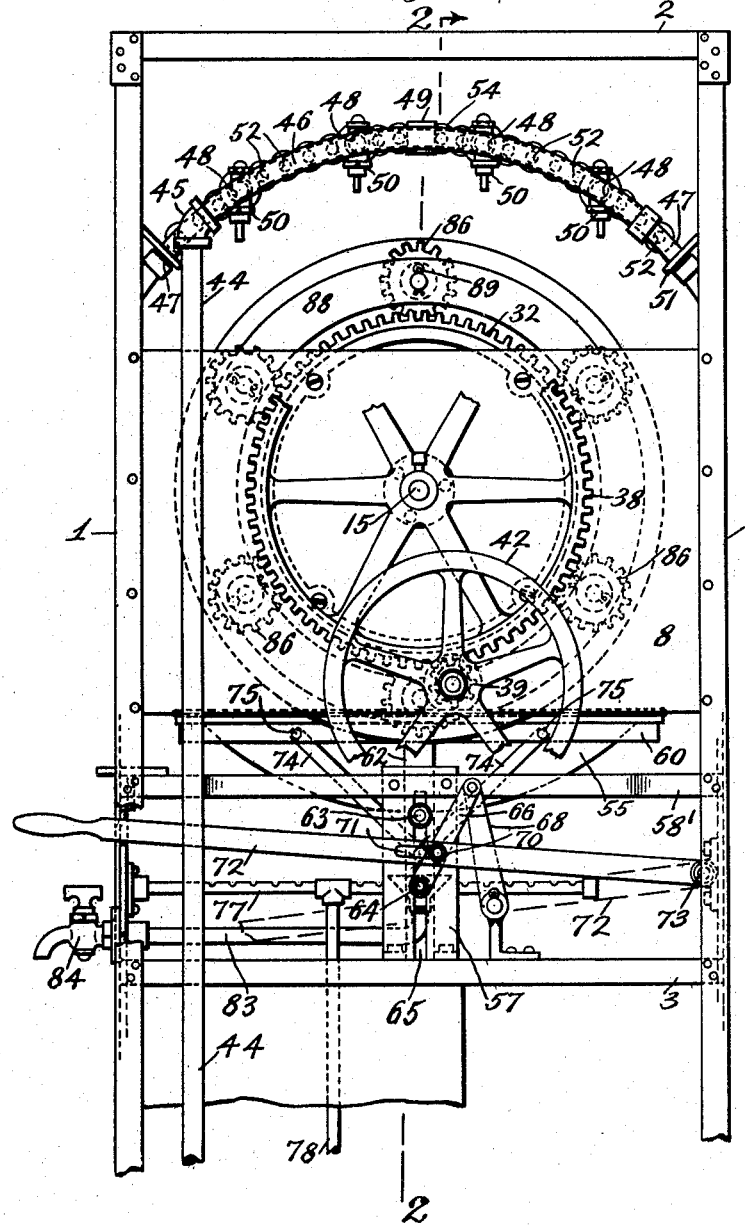
Figure 1 is a side end elevation, partly broken away of the improved apparatus.

In Figs. 1 and 2 a slightly modified form of supporting the spits is shown, which may under some circumstances be employed. In the construction illustrated in these figures the driving gears for the spits are not carried on the shanks or spindles of the spits as before described but are mounted in the carrier heads and rotate therewith. As illustrated these gears marked 86 are provided with hubs 87 which take bearing at their inner ends in the carrier head and at their outer ends in a disk 88, being pinned to this disk by pins 89, this disk rotating with the gears and with the carrier head. The inner end of the hubs is formed with a reduced squared end portion 90 which receives a correspondingly recessed end 91 on the spit spindle 18. The other end of the spit spindle passes through a block 92 in the opposite carrier head and takes against a spring 93 which holds the spit in secured position between the heads. To remove the spit in this construction it is only necessary to grasp the end 94 of the spit spindle which is formed to provide a handle and push the spindle against the spring until the recess 91 is freed from the squared end 90 of the hub 87, when the spit may be removed sidewise from the carriers.

While the invention has been shown and described in its preferred embodiment, it will be understood that various changes may be made in the constructions shown and described, and that the invention is not to be limited to the particular number of spits shown or to the particular method of supplying heat, but changes and variations in these, as well as in other parts, may be made without departing from the invention.

What I claim is:

1. In a cooking apparatus the combination of a rotary carrier, a plurality of food holding devices carried thereby, heating means, means for rotating the carrier to carry the food holding devices past the heating means, and means for intermittently basting food on the holding devices.

2. In a cooking apparatus the combination of a carrier, a plurality of food holding devices carried thereby, heating means, means for effecting a relative movement between the carrier and the heating means, and means for intermittently basting food on the holding devices.

3. In a cooking apparatus the combination of a horizontally arranged rotary carrier, a plurality of food holding devices carried thereby, heating means, means for rotating the carrier past the heating means, means for basting food on the holding devices, and means for effecting a relative movement between the carrier and the basting means.

4. In a cooking apparatus the combination of a horizontally arranged carrier, a plurality of food holding devices carried thereby, heating means, means for effecting a relative movement between the carrier and the heating means, a basting device, and means for effecting a relative movement between the carrier and the baster.

5. In a cooking apparatus, the combination of a frame, a rotary shaft mounted horizontally in the frame, means for driving the shaft, a pair of spaced heads mounted on the shaft, a plurality of spits removably mounted between the heads and the near outer edges thereof, a source of heat above the heads past which the spits successively move, and a basting device located below the heads for catching juice from food held on the spits and into which the spits are successively dipped.

6. In a cooking apparatus, the combination of a frame, a horizontal shaft mounted in the frame, means for driving the shaft, a pair of spaced heads mounted on the shaft, a plurality of spits removably mounted between the heads and near the outer edges thereof, heating means above the heads past which the spits successively move, means for varying the heat delivered by the heating means, and a basting device located below the heads for catching juice from food on the spits into which the spits are successively dipped.

7. In a cooking apparatus the combination of a horizontally arranged rotary carrier, a plurality of food holding devices carried thereby, heating means, means for rotating the carrier past the heating means, basting means, means for rotating the food holding device about their own axes as the carrier moves them past the heating means and the baster, and means for adjusting the baster with respect to the carrier.

8. In a cooking apparatus the combination of a carrier, a plurality of food holding devices carried thereby, heating means, means for effecting a relative movement between the carrier and the heating means, means for basting food on the holding devices, and means for heating the basting means.

9. In a cooking apparatus the combination of a rotary carrier, a plurality of food holding devices carried thereby, a heating means located at one side of the carrier, means for rotating the carrier past the heating means, and a basting trough below the carrier into which food on the holding devices may dip as the carrier rotates.

10. In a cooking apparatus the combination of a carrier, a plurality of food holding devices carried thereby, heating means, means for effecting a relative movement of the carrier and heating means to gradually bring food on the holding devices into cooking relation with the heating means, and means for intermittently basting the food while on the holders.

11. In a cooking apparatus the combination of a rotary carrier, a plurality of food holding devices carried thereby, a heating device located above the carrier, a basting device located below the carrier, and means for rotating the carrier past the heating and basting means to successively expose food on the holders thereto.

12. In a cooking apparatus the combination of a rotary carrier, a plurality of food holding devices carried thereby, a heating device located above the carrier, a basting device located below the carrier, means for rotating the carrier past the heating and basting means, and means for rotating the food holding devices about their own axes as the carrier rotates.

13. In a cooking apparatus the combination of a frame, a horizontally arranged rotary carrier comprising a pair of spaced heads mounted in the frame, a plurality of food holding spindles removably mounted in the heads, means for driving one of the heads, a stationary gear on the frame, gears on the spindles meshing therewith, and a heating means located at one side of the carrier past which the spindles are rotated, and a basting device located below the heating means into which juice from the food on the spindles may drip.

14. In a cooking apparatus the combination of a frame, a shaft mounted in the frame, a carrier comprising a pair of heads mounted on the shaft, means for driving the shaft, a plurality of spindles, fixed casings, grooves in the casings and removable sections through which the spindles may be removed.

15. In a cooking apparatus the combination of a frame, a shaft mounted in the frame, a pair of heads mounted on the shaft, means for driving the shaft, a gear fixed on the frame, a plurality of spindles, a gear on each spindle, fixed casings having grooves forming tracks, removable sections through which the spindles and gears may be removed, and means for operating the sections simultaneously.

16. In a cooking apparatus the combination of a frame, a carrier mounted in the frame, food holding spindles carried by the carrier, means for rotating the carrier, a source of heat above the carrier and a basting trough having a curved bottom located below the carrier and adjustable relatively thereto.

In testimony whereof, I have hereunto set my hand.

VINCENZO PACE.